United States Patent
Itadani et al.

(10) Patent No.: US 9,772,037 B2
(45) Date of Patent: Sep. 26, 2017

(54) SLIDING COMPONENT

(71) Applicant: EAGLE INDUSTRY CO., LTD., Minato-ku, Tokyo (JP)

(72) Inventors: Masatoshi Itadani, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 417 days.

(21) Appl. No.: 14/400,269

(22) PCT Filed: Jul. 31, 2013

(86) PCT No.: PCT/JP2013/070714
§ 371 (c)(1),
(2) Date: Nov. 10, 2014

(87) PCT Pub. No.: WO2014/024742
PCT Pub. Date: Feb. 13, 2014

(65) Prior Publication Data
US 2015/0123350 A1 May 7, 2015

(30) Foreign Application Priority Data
Aug. 4, 2012 (JP) .................................. 2012-173494

(51) Int. Cl.
*F16J 15/34* (2006.01)

(52) U.S. Cl.
CPC ....... *F16J 15/3412* (2013.01); *F16J 15/3424* (2013.01)

(58) Field of Classification Search
CPC ..................... F16J 15/3408–15/3432
See application file for complete search history.

(56) References Cited

U.S. PATENT DOCUMENTS 3,527,465 A 9/1970 Guinard
5,174,584 A * 12/1992 Lahrman ............. F16J 15/3412
277/400

(Continued)

FOREIGN PATENT DOCUMENTS

CN 1401924 A 3/2003
JP S59-195253 U 12/1984

(Continued)

OTHER PUBLICATIONS

A Second Office Action issued on Jul. 25, 2016 by the State Intellectual Property Office of China for Chinese counterpart application No. 201380029125.0.

(Continued)

*Primary Examiner* — Vishal Patel
(74) *Attorney, Agent, or Firm* — Hayes Soloway P.C.

(57) ABSTRACT

A sliding component, which achieves both sealing and lubrication by preventing cavitation from occurring in the dynamic-pressure generation mechanism and thereby solving the problem of leakage that will otherwise result from such cavitation, is characterized in that, on a sealing face of one of a pair of sliding parts that slide against each other, extremely shallow grooves constituting a Rayleigh step mechanism are provided in a manner facing the high-pressure fluid side of the sealing face, while deep fluid-introduction grooves for introducing the high-pressure fluid are provided on the upstream side of the extremely shallow grooves in a manner continuing to the high-pressure fluid side.

12 Claims, 10 Drawing Sheets

(56) References Cited

U.S. PATENT DOCUMENTS

| | | | |
|---|---|---|---|
| 5,180,173 A | 1/1993 | Kimura et al. | |
| 5,447,316 A * | 9/1995 | Matsui | F16J 15/3412 277/400 |
| 5,556,111 A * | 9/1996 | Sedy | F16J 15/3412 277/400 |
| 5,558,341 A * | 9/1996 | McNickle | F16J 15/3488 277/400 |
| 6,213,473 B1 | 4/2001 | Lebeck | |
| 6,692,006 B2 * | 2/2004 | Holder | F16J 15/442 277/346 |
| 7,258,346 B2 * | 8/2007 | Tejima | F16J 15/3412 277/399 |
| 7,931,277 B2 * | 4/2011 | Garrison | F01D 25/183 277/399 |
| 8,342,534 B2 * | 1/2013 | Vasagar | F16J 15/3244 277/399 |
| 9,151,390 B2 * | 10/2015 | Hosoe | F16J 15/3412 |
| 9,228,660 B2 * | 1/2016 | Hosoe | F16J 15/3412 |
| 2008/0100001 A1 | 5/2008 | Flaherty | |
| 2011/0215535 A1 * | 9/2011 | Vasagar | F16J 15/3244 277/559 |
| 2012/0217705 A1 * | 8/2012 | Hosoe | F16J 15/3412 277/400 |
| 2013/0209011 A1 | 8/2013 | Tokunaga | |

FOREIGN PATENT DOCUMENTS

| | | |
|---|---|---|
| JP | H05-060247 A | 3/1993 |
| JP | H06-017941 A | 1/1994 |
| JP | H06-105105 B | 12/1994 |
| JP | 2008-106940 A | 5/2008 |
| JP | 2012-002295 A | 1/2012 |
| WO | 2011/115073 A1 | 9/2011 |
| WO | 2012/046749 A1 | 4/2012 |

OTHER PUBLICATIONS

International Search Report (ISR) mailed Oct. 29, 2013, issued for International application No. PCT/JP2013/070714.
First Notification of Reason for Refusal with Search Report dated Sep. 25, 2015 by the State Intellectual Property Office of China for Chinese counterpart application No. 201380029125.0.
Notification of Transmittal of Translation of the International Preliminary Report on Patentability (PCT/IB/338) dated Feb. 19, 2015, with International Preliminary Report on Patentability (PCT/IB/373) and Written Opinion of the International Searching Authority (PCT/ISA/237), for corresponding international application PCT/JP2013/070713.

* cited by examiner

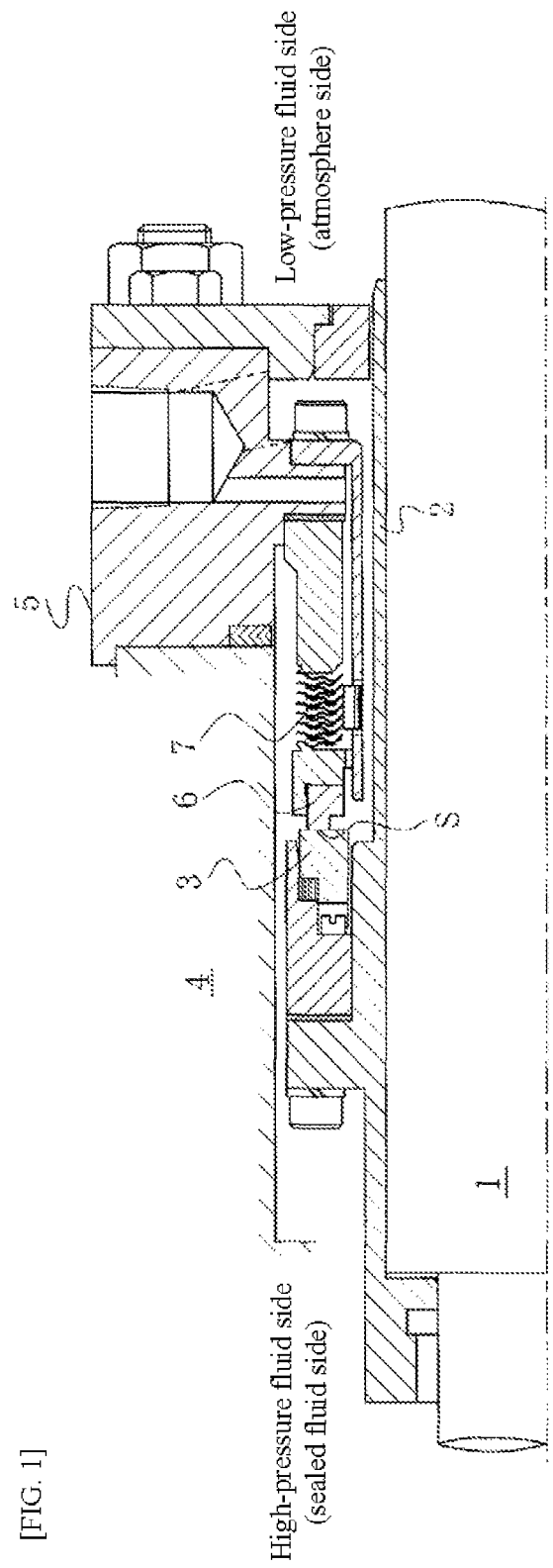
[FIG. 1]

[FIG. 2]
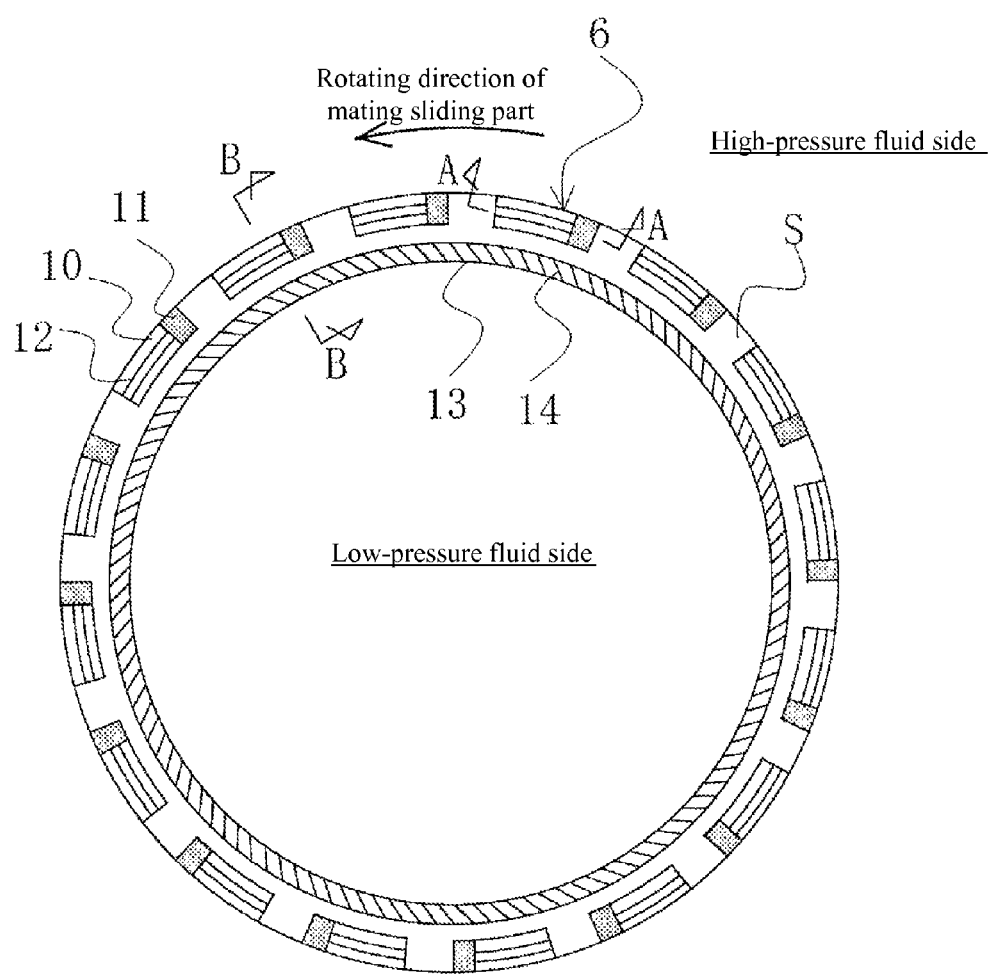

[FIG. 3]
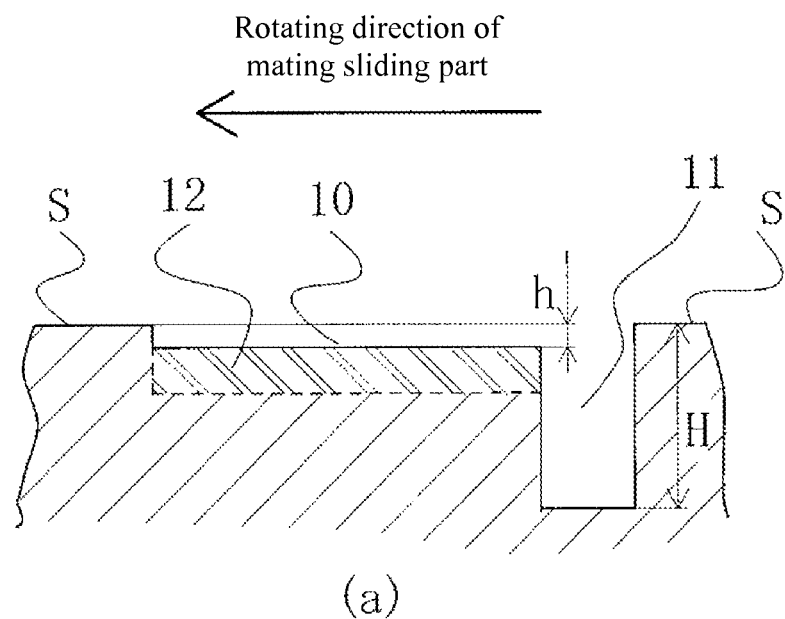
(a)
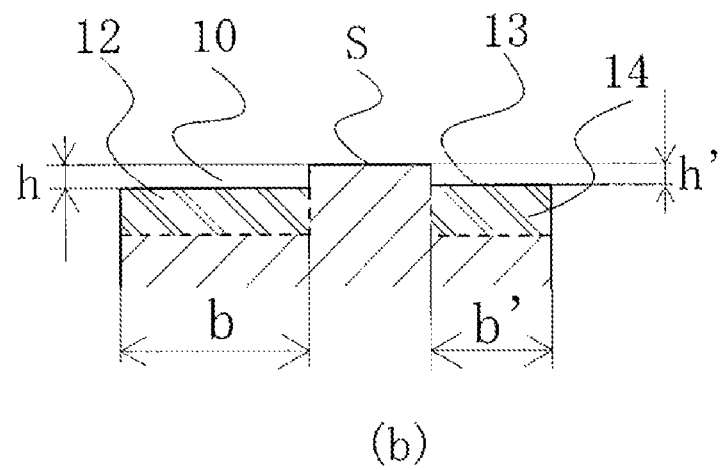
(b)

[FIG. 4]
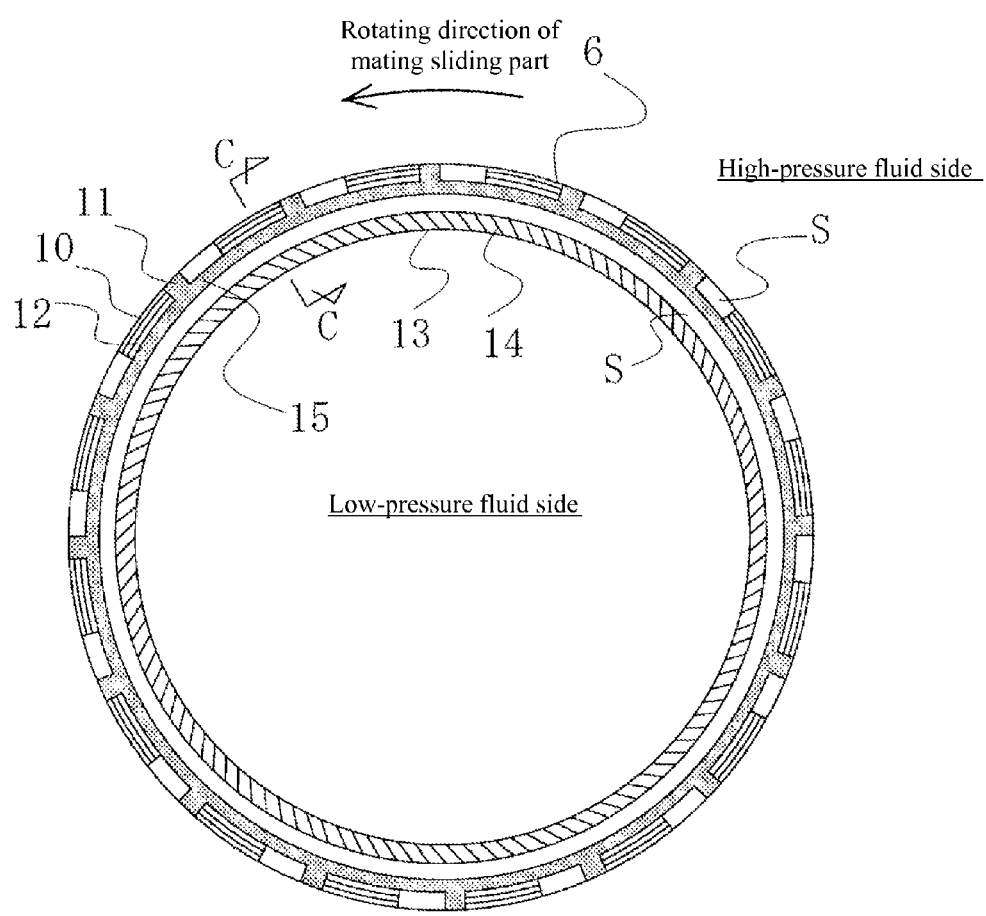

[FIG. 5]
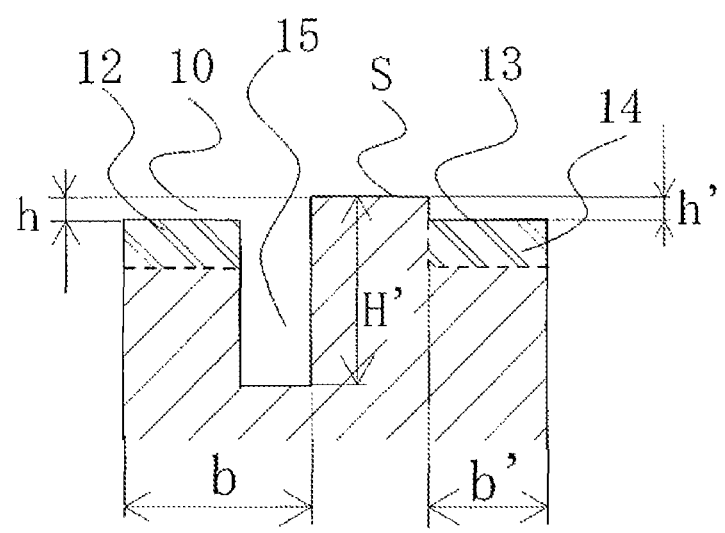

[FIG. 6]
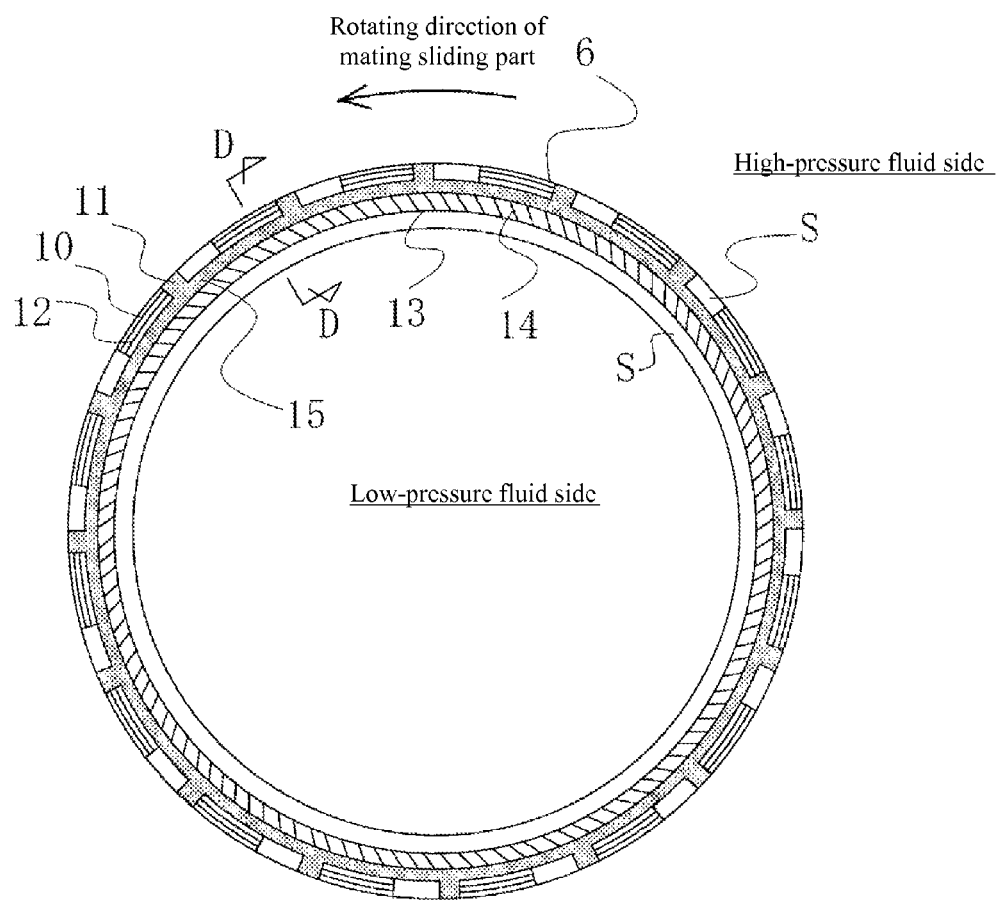

[FIG. 7]
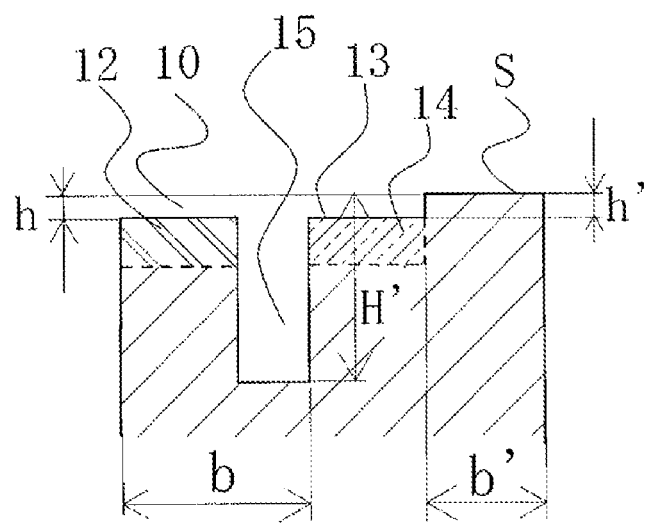

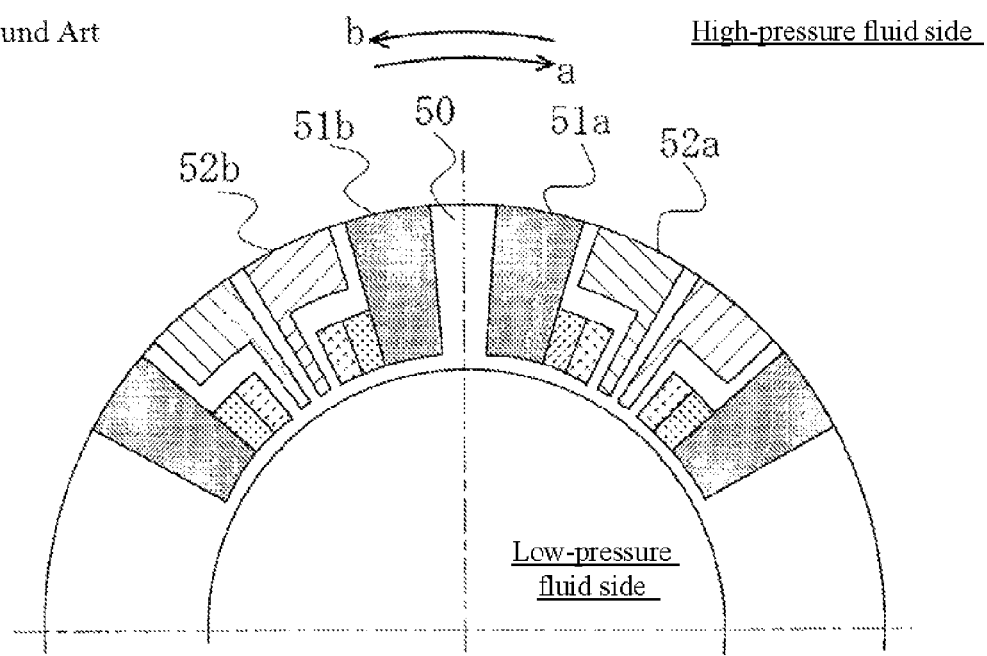

[FIG. 9]
Background Art
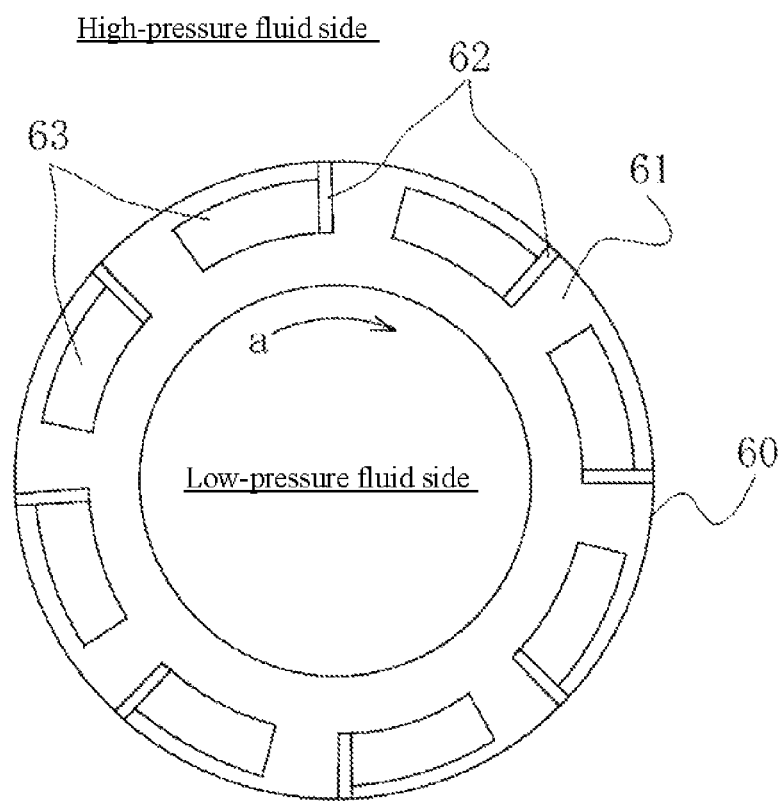

[FIG. 10]
Background Art
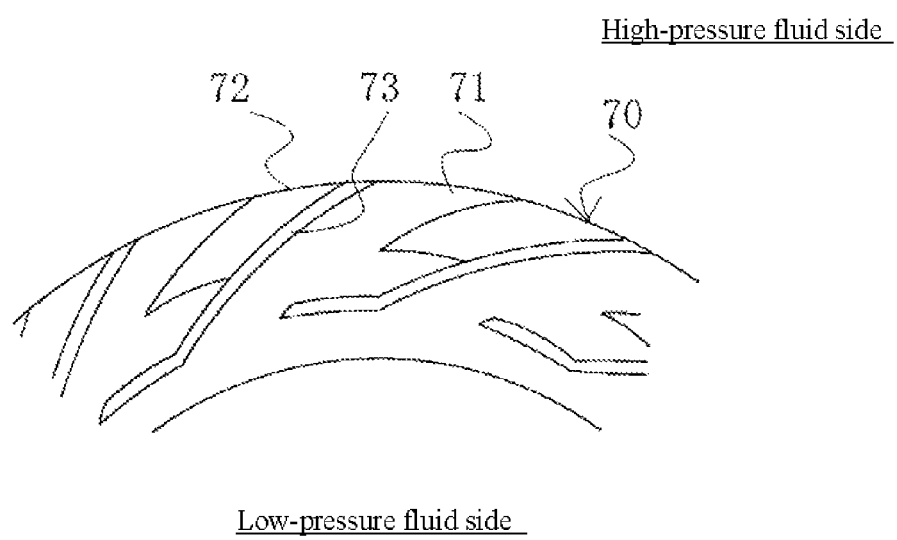

SLIDING COMPONENT

This application is the U.S. National Phase under 35 U.S.C. §371 of International Application PCT/JP2013/070714, filed Jul. 31, 2013, which claims priority to Japanese Patent Application No. 2012-173494, filed Aug. 4, 2012. The International Application was published under PCT Article 21(2) in a language other than English.

TECHNICAL FIELD

The present invention relates to a sliding component suitable for mechanical seals, bearings and other sliding mechanisms, for example. In particular, the present invention relates to a sliding component for seal rings, bearings, etc., that must reduce friction by retaining a fluid on the sealing face and also prevent the fluid from leaking from the sealing face.

BACKGROUND ART

For a mechanical seal, which is an example of sliding component, to maintain sealing property for a long period of time, it must satisfy the mutually exclusive conditions of "seal" and "lubricate." Particularly in recent years, the demand for lower friction is increasing further in the area of environmental protection, etc., as a means to prevent the sealed fluid from leaking while reducing mechanical loss at the same time. One way to reduce friction is to generate dynamic pressure between the sealing faces by means of rotation to create the so-called fluid lubrication state where the surfaces slide against each other with a liquid film in between. In this case, however, positive pressure generates between the sealing faces and the fluid flows from the sealing faces from the part subject to the positive pressure. This is the so-called lateral leak that occurs with bearings and corresponds to the sealing leak.

As shown in FIG. 8, traditionally with a sliding component used for the so-called "inside type" mechanical seal, etc., where high-pressure fluid (sealed fluid) is present on the outer periphery side and low-pressure fluid (atmosphere) on the inner periphery side of the seal area to seal the high-pressure fluid on the outer periphery side, multiple dynamic-pressure generation grooves 51a, 51b as well as multiple concave/convex parts 52a, 52b constituted by multiple fine parallel grooves are formed on a sealing face 50 in order to provide stable sliding properties regardless of the rotating speed of the rotational axis, in such a constitution that the dynamic-pressure generation groove 51a and concave/convex part 52a generate desired dynamic pressure and improve lubrication performance, respectively, when the flow direction of sealed fluid corresponds to the direction of arrow a, while the dynamic-pressure generation groove 51b and concave/convex part 52b generate desired dynamic pressure and improve lubrication performance, respectively, when the flow direction of sealed fluid corresponds to the direction of arrow b (hereinafter referred to as "Prior Art 1"; refer to Patent Literature 1, for example).

Also among the same so-called "inside type" mechanical seals, a mechanical seal is known, as shown in FIG. 9, where multiple fluid-introduction grooves 62 extending inward in a radial direction are formed on a seal area 61 of a rotating seal ring 60 in such a way that their outer end opens on the outward side in a radial direction while the inner end is present on the seal area, while dynamic-pressure generation grooves 63 continuing to these fluid-introduction grooves 62 and extending to one direction in the circumferential direction are formed, and as the rotating seal ring 60 is rotated in the direction of arrow a, fluid on the high-pressure fluid side (sealed fluid side) flows into the dynamic-pressure generation grooves 63 from the fluid-introduction grooves 62 to generate dynamic pressure between the seal area 61 of the rotating seal ring 60 and seal area of the stationary seal ring (hereinafter referred to as "Prior Art 2"; refer to FIG. 5 of Patent Literature 2, for example).

Also among the same so-called "inside type" mechanical seals, a mechanical seal is known, as shown in FIG. 10, where multiple wide spiral grooves 72 are formed on a seal contacting area 71 of a rotating seal ring 70 and narrow parts 73 extending to a position corresponding to 70 to 90% of the width of the seal contacting area 71 are provided on the tip side of the spiral grooves 72, with the spiral grooves 72 and narrow parts 73 set to different depths, respectively, in order to keep the seal contacting area in a non-contacting state by supplementing the static pressure effect when the dynamic pressure effect is small such as in a low-rpm condition, while keeping the seal contacting area in a non-contacting state via the dynamic pressure effect while turning even when the seal contacting area generates a strain that makes the end face higher on the outer side (hereinafter referred to as "Prior Art 3"; refer to FIGS. 4 to 6 of Patent Literature 3, for example).

However, Prior Art 1 presents a problem in that, regardless of the rotating direction, the dynamic-pressure generation grooves and concave/convex parts constituted by fine grooves are arranged in pairs in order to generate dynamic pressure and improve lubrication performance, and therefore cavitation always occurs at the negative step (step from the higher surface to the lower surface) between each pair of grooves during operation, which means that when this prior art is used as a mechanical seal for automotive water pumps, the constituents of sealed fluid may deposit onto, attach to, and accumulate on the sealing face due to cavitation, potentially leading to massive leakage.

On the other hand, Prior Art 2 presents a problem in that, although the depositing of the constituents of sealed fluid onto the sealing face due to cavitation is assumed to decrease, the fact that the dynamic-pressure generation grooves 63 do not directly continue to the high-pressure fluid side (sealed fluid side) means that, should any deposit be produced in the dynamic-pressure generation grooves 63 or any deposit or other foreign matter enter the dynamic-pressure generation grooves 63, such foreign matter is not discharged from, but remains inside, the dynamic-pressure generation grooves 63 to cause leakage.

Meanwhile, Prior Art 3 is intended to keep the seal contacting area in a non-contacting state by supplementing the static pressure effect when the dynamic pressure effect is small such as in a low-rpm condition, while keeping the seal contacting area in a non-contacting state via the dynamic pressure effect while turning even when the seal contacting area generates a strain that makes the end face higher on the outer side, which practically means that the high-pressure fluid entering the narrow parts 73 is used to obtain the static pressure effect in a low-rpm condition where the dynamic pressure effect is small, while the pumping action of spiral grooves 72 is used to generate dynamic pressure while turning, and no technical idea is disclosed to prevent cavitation.

CITATION LIST

Patent Literatures

Patent Literature 1: International Patent Laid-open No. 2011/115073

Patent Literature 2: Japanese Patent Laid-open No. Hei 05-60247

Patent Literature 3: Japanese Patent Laid-open No. Hei 06-105105

SUMMARY OF INVENTION

Technical Problem

An object of the present invention is, with respect to a sliding component that turns to generate dynamic pressure between the sealing faces and slides in a condition where liquid film is present between the sealing faces, to provide a sliding component that can both seal and lubricate by preventing cavitation from occurring in the dynamic-pressure generation mechanism and thereby solve the problem of leakage that will otherwise result from such cavitation.

Solution to Problem

To achieve the aforementioned object, firstly the sliding component proposed by the present invention is characterized in that, on the sealing face of one of a pair of sliding parts that slide against each other, extremely shallow grooves constituting a Rayleigh step mechanism are provided in a manner facing the high-pressure fluid side of the sealing face, while deep fluid-introduction grooves for introducing the high-pressure fluid are provided on the upstream side of the extremely shallow grooves in a manner continuing to the high-pressure fluid side.

According to these features, high-pressure fluid is actively introduced to the upstream side of the extremely shallow grooves in the circumferential direction via the deep fluid-introduction grooves, and consequently the decompression that would otherwise occur as the fluid flows into the extremely shallow grooves is suppressed and cavitation is prevented as a result. In addition, should any deposit be produced in the extremely shallow grooves or any deposit or other foreign matter enter the grooves, such foreign matter would be discharged from the extremely shallow grooves toward the high-pressure fluid side instead of remaining in the extremely shallow grooves and causing leakage.

Furthermore, secondly, the sliding component proposed by the present invention is characterized in that, in addition to the first features, at least one or more of the extremely shallow grooves are provided in a circular pattern.

According to these features, the number of negative steps (steps from the higher surface to the lower surface) that cause cavitation can be controlled by setting the number of extremely shallow grooves as deemed appropriate.

Furthermore, thirdly, the sliding component proposed by the present invention is characterized in that, in addition to the first or second features, the depth of the extremely shallow grooves from the sealing face is preferably 0.1 to 0.6 µm, while the depth of the deep fluid-introduction grooves from the sealing face is preferably 10 µm or more.

According to these features, the dynamic pressure generating on the sealing face can be set to an optimal range, while cavitation can be prevented with greater certainty.

Furthermore, fourthly, the sliding component proposed by the present invention is characterized in that, in addition to any of the first through third features, circular deep pressure-reduction grooves are provided in a manner facing the low-pressure fluid side of the extremely shallow grooves and deep fluid-introduction grooves, for separating the extremely shallow grooves and deep fluid-introduction grooves from the sealing face on the low-pressure fluid side and thereby reducing the pressure acting upon the sealing face on the low-pressure fluid side.

According to these features, the extremely shallow grooves where dynamic pressure generates are separated from the sealing face S on the low-pressure fluid side of the extremely shallow grooves and deep fluid-introduction grooves, and consequently the fluid pressure acting upon the sealing face on the low-pressure fluid side is reduced to roughly equivalent to the pressure on the high-pressure fluid side and the amount of fluid leaking toward the low-pressure fluid side can be reduced as a result.

Furthermore, fifthly, the sliding component proposed by the present invention is characterized in that, in addition to the fourth features, the depth of the deep pressure-reduction grooves from the sealing face is preferably 10 µm or more.

According to these features, the fluid pressure acting upon the sealing face on the low-pressure fluid side can be reduced with greater certainty and the amount of fluid leaking toward the low-pressure fluid side can be reduced with greater certainty as a result.

Furthermore, sixthly, the sliding component proposed by the present invention is characterized in that, in addition to any of the first through fifth features, circular pumping grooves acting to push back toward the high-pressure fluid side the fluid that tends to leak from the high-pressure fluid side toward the low-pressure fluid side are provided on the sealing face facing the low-pressure fluid side.

According to these features, the fluid that tends to leak from the sealing face toward the low-pressure fluid side can be reduced.

Furthermore, seventhly, the sliding component proposed by the present invention is characterized in that, in addition to any of the first through fifth features, circular pumping grooves acting to push back toward the high-pressure fluid side the fluid that tends to leak from the high-pressure fluid side toward the low-pressure fluid side are provided on the sealing face facing the low-pressure fluid side of the deep pressure-reduction grooves.

According to these features, the high-pressure fluid side of the pumping grooves has no wall to prevent the fluid that tends to leak toward the low-pressure fluid side from being pushed back toward the high-pressure fluid side, even when the pumping grooves are provided on the surfaces of circular extremely shallow steps that are lower than the sealing face, and consequently sufficient pumping effect can be demonstrated and leakage toward the low-pressure fluid side can be prevented as a result.

Furthermore, eighthly, the sliding component proposed by the present invention is characterized in that, in addition to the sixth or seventh features, the pumping grooves are provided on the surfaces of circular extremely shallow steps that are lower than the sealing face.

According to these features, the pumping grooves do not directly contact the mating sealing face, even when all fluid on the sealing face is gone, which prevents the pumping grooves from causing an increase in rotational torque.

Advantageous Effects of Invention

The present invention has excellent effects as described below:

(1) Extremely shallow grooves constituting a Rayleigh step mechanism are provided in a manner facing the high-pressure fluid side of the sealing face, while deep fluid-introduction grooves for introducing the high-pressure fluid are provided on the upstream side of the extremely shallow grooves in a manner continuing to the high-pressure fluid side, and accordingly high-pressure fluid is actively introduced to the upstream side of the extremely shallow grooves in the circumferential direction via the deep fluid-introduction grooves, and consequently the decompression that would otherwise occur as the fluid flows into the extremely shallow grooves is suppressed and cavitation is prevented as a result. In addition, should any deposit be produced in the extremely shallow grooves or any deposit or other foreign matter enter the grooves, such foreign matter would be discharged from the extremely shallow grooves toward the high-pressure fluid side instead of remaining in the extremely shallow grooves and causing leakage.

(2) The number of negative steps (steps from the higher surface to the lower surface) that cause cavitation can be controlled by setting the number of extremely shallow grooves as deemed appropriate.

(3) Circular deep pressure-reduction grooves are provided in a manner facing the low-pressure fluid side of the extremely shallow grooves and deep fluid-introduction grooves, for separating the extremely shallow grooves and deep fluid-introduction grooves from the sealing face on the low-pressure fluid side and thereby reducing the pressure acting upon the sealing face on the low-pressure fluid side, and accordingly the extremely shallow grooves where dynamic pressure generates are separated from the sealing face S on the low-pressure fluid side of the extremely shallow grooves and deep fluid-introduction grooves, and consequently the fluid pressure acting upon the sealing face on the low-pressure fluid side is reduced to roughly equivalent to the pressure on the high-pressure fluid side and the amount of fluid leaking toward the low-pressure fluid side can be reduced as a result.

(4) Circular pumping grooves acting to push back toward the high-pressure fluid side the fluid that tends to leak from the high-pressure fluid side toward the low-pressure fluid side are provided on the sealing face facing the low-pressure fluid side, and consequently the fluid that tends to leak from the sealing face toward the low-pressure fluid side can be reduced.

(5) Circular pumping grooves acting to push back toward the high-pressure fluid side the fluid that tends to leak from the high-pressure fluid side toward the low-pressure fluid side are provided on the sealing face facing the low-pressure fluid side of the deep pressure-reduction grooves, and accordingly the high-pressure fluid side of the pumping grooves has no wall to prevent the fluid that tends to leak toward the low-pressure fluid side from being pushed back toward the high-pressure fluid side, even when the pumping grooves are provided on the surfaces of circular extremely shallow steps that are lower than the sealing face, and consequently sufficient pumping effect can be demonstrated and leakage toward the low-pressure fluid side can be prevented as a result.

(6) The pumping grooves are provided on the surfaces of circular extremely shallow steps that are lower than the sealing face, and accordingly the pumping grooves do not directly contact the mating sealing face, even when all fluid on the sealing face is gone, which prevents the pumping grooves from causing an increase in rotational torque.

BRIEF DESCRIPTION OF DRAWINGS

FIG. 1 Longitudinal section view showing an example of a mechanical seal for general industrial machinery.

FIG. 2 Plan view pertaining to Embodiment 1 of the present invention, showing a sealing face on which extremely shallow grooves and deep fluid-introduction grooves are formed.

FIG. 3 (a) is a section view of FIG. 2 as cut along line A-A, while (b) is a section view of FIG. 2 as cut along line B-B.

FIG. 4 Plan view pertaining to Embodiment 2 of the present invention, showing a sealing face on which extremely shallow grooves and deep fluid-introduction grooves are formed.

FIG. 5 Section view of FIG. 4 as cut along line C-C.

FIG. 6 Plan view pertaining to Embodiment 3 of the present invention, showing a sealing face on which extremely shallow grooves and deep fluid-introduction grooves are formed.

FIG. 7 Section view of FIG. 6 as cut along line D-D.

FIG. 8 View explaining Prior Art 1.

FIG. 9 Plan view explaining Prior Art 2.

FIG. 10 Plan view explaining Prior Art 3.

DESCRIPTION OF EMBODIMENTS

Modes for carrying out a sliding component according to the present invention are explained in detail by referring to the drawings.

It should be noted that, while the embodiments herein are explained as an example where the part comprising the mechanical seal is a sliding component, interpretation of the present invention is not limited to the foregoing, and various changes, modifications, and improvements can be added based on the knowledge of those skilled in the art so long as they do not deviate from the scope of the present invention.

Embodiment 1

A sliding component pertaining to Embodiment 1 for carrying out the present invention is explained by referring to FIGS. 1 to 3.

FIG. 1 is a front section view showing an example of a mechanical seal for general industrial machinery.

The mechanical seal in FIG. 1 is of the inside type, which is the type that seals the high-pressure fluid (sealed fluid) that tends to leak from the outer periphery to the inner periphery of the sealing face, comprising: a circular rotating ring 3 that constitutes one sliding part provided via a sleeve 2 on a rotational axis 1 for driving a pump impeller (not illustrated) on the high-pressure fluid side (sealed fluid side) in a manner rotatable together with the rotational axis 1; and a circular stationary ring 6 that constitutes the other sliding part provided on a seal cover 5 fixed on a pump housing 4 in a manner not rotatable but movable in the axial direction, wherein the sealing faces S of the two that have been mirror-surface-finished by means of lapping, etc., are caused to slide against each other while remaining in contact via a bellows 7 that biases the stationary ring 6 in the axial direction. In other words, this mechanical seal prevents the high-pressure fluid (sealed fluid) from flowing from the outer periphery to the inner periphery side of the rotational axis 1 between the sealing faces S of the rotating ring 3 and stationary ring 6.

Typically the rotating ring 3 and stationary ring 6 are both formed from SiC (hard material) or one is formed from SiC (hard material) and the other from carbon (soft material), but for the sliding-part material, anything that is in use as a sliding-part material for mechanical seals can be applied. The SiC may be a sintered compact using boron, aluminum, carbon, etc., as a sintering auxiliary, or it may be a material constituted by two or more different phases each having a different constituent and composition, such as SiC in which graphite grains are dispersed, reaction-sintered SiC constituted by SiC and Si, SiC—TiC or SiC—TiN. For the carbon, a mixture of carbon and graphite materials, resin forming carbon, sintered carbon, etc., can be used. Besides the aforementioned sliding-part materials, metal materials, resin materials, surface reforming materials (coating materials), and complex materials can also be applied.

FIGS. 2 and 3, for example, explain a case where extremely shallow grooves and deep fluid-introduction grooves conforming to the present invention are provided on the sealing face S of the circular stationary ring 6 which is one of the sliding parts, but it goes without saying that these grooves can be provided on the sealing face of the circular rotating ring 3.

Normally, high-pressure fluid (sealed fluid) is present on one side and low-pressure fluid (atmosphere) on the other side of the inner/outer peripheries of sealing face S of the sliding component. FIGS. 2 and 3 explain a case where, for illustration purposes, high-pressure fluid is present on the outer periphery side and low-pressure fluid (atmosphere) is present on the inner periphery side.

The section of the stationary ring 6 has a convex shape, as shown in FIG. 1, and its top face constitutes the sealing face S. The gap between the sealing faces of the rotating ring 3 and stationary ring 6 varies depending on the type of mechanical seal, but is generally 0.25 to 2.5 µm. Formed on the sealing face S of the stationary ring 6 in a manner facing the high-pressure fluid side, as shown in FIGS. 2 and 3, is a Rayleigh step mechanism, or specifically, extremely shallow grooves 10 constituting a Rayleigh step mechanism having steps, wherein the viscous fluid present between the sealing faces generates dynamic pressure (positive pressure) as a result of relative movement of the rotating ring 3 and stationary ring 6. In FIG. 2, the extremely shallow grooves 10 are set in such a way that their radius-direction width b corresponds to approximately one-half the radius-direction width of the sealing face S in plan view, and are arranged in a circular pattern dividing the circumference into 16 equal parts, where each extremely shallow groove 10 is formed independently by being separated by the sealing face S in the circumferential direction. In addition, preferably the depth h of the extremely shallow groove 10 from the sealing face S is set to a range of 0.1 to 0.6 µm.

It should be noted that there is no need to provide multiple extremely shallow grooves 10 in the circumferential direction, as providing at least one groove is enough, and also that their radius-direction width b is set as deemed appropriate based on the type and pressure of sealed fluid, etc., preferably in a range of one-half to one-tenth the radial-direction width of the sealing face, for example.

FIG. 2 shows an example where concentric fine periodic grooves 12 are formed on the extremely shallow groove 10 surfaces to improve the dynamic pressure effect further. The purpose here is to illustrate the fine periodic grooves 12 in an easy-to-understand manner and the number of fine periodic grooves 12 can be greater. Grooves for improving the dynamic pressure effect further, such as the fine periodic grooves 12, are not an absolute requirement and may be absent. Additionally, even when grooves such as the fine periodic grooves 12 are provided, their shape is not limited to concentric circle, and linear fine periodic grooves having a specific angle to the tangential line to a concentric circle may be used. Straight fine periodic grooves having a specific angle to the tangential line to a concentric circle offer the advantage of permitting control of the dynamic pressure generated in the extremely shallow grooves 10.

It should be noted that, under the present invention, fine periodic grooves are multiple fine linear concaves/convexes running in parallel with one another at a specific pitch, where the linear concaves/convexes include straight concaves/convexes, slightly curved concaves/convexes appearing in the process of forming straight concaves/convexes, arc-shaped concaves/convexes and other curved concaves/convexes.

Provided on the upstream side of the extremely shallow grooves 10 are deep fluid-introduction grooves 11 that continue to the high-pressure fluid side and are used to introduce the high-pressure fluid into the extremely shallow grooves 10. The deep fluid-introduction grooves 11 are provided across the extremely shallow grooves 10 in the radius direction in a manner facing the upstream side of the extremely shallow grooves 10. In the meantime, preferably the depth H of the deep fluid-introduction grooves 11 from the sealing face S is set to 10 µm or more. In this case, the upper limit of depth H is not infinite, but it is automatically set to a finite value according to the axial-direction length of the stationary ring 6. In addition, the circumferential-direction length of the deep fluid-introduction grooves 11 is determined according to the type of the sealed fluid and sliding speed of the sealing face and ideally greater than the depth h of the extremely shallow grooves 10, at least, so that the high-pressure fluid is introduced more easily to the extremely shallow grooves 10.

The extremely shallow grooves 10, deep fluid-introduction grooves 11 and fine periodic grooves 12 are formed by means of etching, femtosecond laser, or picosecond laser, for example.

If deep fluid-introduction grooves 11 that continue to the high-pressure fluid side and are used to introduce the high-pressure fluid into the extremely shallow grooves 10 are not provided on the upstream side of the extremely shallow grooves 10, decompression occurs as the fluid flows into the extremely shallow grooves 10 whose volume is greater than the volume between the sealing faces, and cavitation occurs as a result; under the present invention, however, where deep fluid-introduction grooves 11 for introducing the high-pressure fluid into the extremely shallow grooves 10 are provided, the fluid on the upstream side of the extremely shallow grooves 10 in the circumferential direction is actively introduced to the extremely shallow grooves 10 via the deep fluid-introduction grooves 11, which suppresses the decompression that would otherwise occur as the fluid flows in and cavitation is prevented as a result. In addition, should any deposit be produced in the extremely shallow grooves 10 or any deposit or other foreign matter enter the grooves, such foreign matter would be discharged from the extremely shallow grooves toward the high-pressure fluid side instead of remaining in the extremely shallow grooves and causing leakage.

It should be noted that, in Embodiment 1 of the present invention where deep fluid-introduction grooves 11 that continue to the high-pressure fluid side and are used to introduce the high-pressure fluid into the extremely shallow grooves 10 are provided on the upstream side of the extremely shallow grooves 10, the stationary ring 6 (or rotating ring 3) should turn only in one direction and it is not suited for turning in both directions.

Also provided on the sealing face S having the extremely shallow grooves 10, in a manner facing the low-pressure fluid side, are circular pumping grooves 14 that act to push back toward the high-pressure fluid side the fluid that tends to leak from the sealing face S toward the low-pressure fluid side. By providing the pumping grooves 14 this way, the fluid that tends to leak from the sealing face S toward the low-pressure fluid side is reduced. The pumping grooves 14 are constituted by spiral grooves, dimples, or fine periodic grooves, for example.

Also, while the pumping grooves 14 may be provided on the same surface as the sealing face S, ideally they are provided on the surfaces of circular extremely shallow steps 13 that are lower than the sealing face S. Preferably the depth h' of the extremely shallow step 13 from the sealing face S is set to a range of 0.1 to 0.6 μm. Further, preferably the radial-direction width b' of the extremely shallow step 13 is set to a range of one-half to one-tenth the radial-direction width of the sealing face S, for example. When pumping grooves 14 are formed on the surfaces of circular extremely shallow steps 13 that are lower than the sealing face S, not when pumping grooves 14 are formed directly on the sealing face S, the extremely shallow steps 13 do not directly contact the mating sealing face even when all fluid on the sealing face S is gone, which prevents the pumping grooves 14 from causing an increase in rotational torque. The extremely shallow steps 13 and pumping grooves 14 are formed by means of etching, femtosecond laser, or picosecond laser, for example.

Embodiment 2

The sliding component pertaining to Embodiment 2 of the present invention is explained by referring to FIGS. 4 and 5.

Embodiment 2 is different from Embodiment 1 in that deep pressure-reduction grooves are added, but the remainder of the constitution is the same as in Embodiment 1 and therefore the same members also used in Embodiment 1 are denoted by the same symbols and are not explained redundantly.

In FIG. 4, circular deep pressure-reduction grooves 15 are provided on the sealing face of the stationary ring 6 having the extremely shallow grooves 10 and deep fluid-introduction grooves 11, in a manner facing the low-pressure fluid side of the extremely shallow grooves 10 and deep fluid-introduction grooves 11, for separating the extremely shallow grooves 10 and deep fluid-introduction grooves 11 from the sealing face on the low-pressure fluid side and thereby reducing the pressure acting upon the sealing face on the low-pressure fluid side. The deep pressure-reduction grooves 15 continue to the high-pressure fluid side via the deep fluid-introduction grooves 11.

In FIG. 4, the extremely shallow grooves 10 and deep fluid-introduction grooves 11 are formed in such a way that their radial-direction width becomes narrower than the corresponding width in Embodiment 1, with the deep pressure-reduction grooves 15 formed over the width-reduction area, while the radial-direction width of the sealing face S on the low-pressure fluid side of the extremely shallow grooves 10 and deep fluid-introduction grooves 11 and that of the extremely shallow step 13 are set the same as the corresponding widths in Embodiment 1.

In addition, the deep pressure-reduction grooves 15 are provided all around in a manner facing the low-pressure fluid side of the extremely shallow grooves 10 and deep fluid-introduction grooves 11. Furthermore, preferably the depth H' of the deep pressure-reduction grooves 15 from the sealing face S is set to 10 μm or more. In this case, the upper limit of depth H' is not infinite, but it is automatically set to a finite value according to the axial-direction length of the stationary ring 6. The deep pressure-reduction grooves 15 are formed by means of etching, femtosecond laser, or picosecond laser, for example.

The fluid pressure acting upon the sealing face S on the low-pressure fluid side of the extremely shallow grooves 10 and deep fluid-introduction grooves 11 is higher than the pressure on the high-pressure fluid side because of the dynamic pressure (positive pressure) generated in the extremely shallow grooves 10 by the viscous fluid present between the sealing faces as a result of relative movement of the rotating ring 3 and stationary ring 6, but by providing deep pressure-reduction grooves 15 all around in a manner facing the low-pressure fluid side of the extremely shallow grooves 10 and deep fluid-introduction grooves 11, the extremely shallow grooves 10 where dynamic pressure generates are separated, by the deep pressure-reduction grooves 15, from the sealing face S on the low-pressure fluid side, and therefore the fluid pressure acting upon the sealing face S on the low-pressure fluid side is reduced to roughly equivalent to the pressure on the high-pressure fluid side.

Embodiment 3

The sliding component pertaining to Embodiment 3 of the present invention is explained by referring to FIGS. 6 and 7.

Embodiment 3 is different from Embodiment 2 in that circular pumping grooves are provided on the sealing face facing the low-pressure fluid side of the deep pressure-reduction grooves, but the remainder of the constitution is the same as in Embodiment 2 and therefore the same members also used in Embodiment 2 are denoted by the same symbols and are not explained redundantly.

In FIG. 6, the circular pumping grooves 14 are provided not on the sealing face S facing the low-pressure fluid side as in Embodiments 1 and 2, but they are provided on the sealing face S facing the low-pressure fluid side of the deep pressure-reduction grooves 15. Also, ideally, the pumping grooves 14 are provided on the surfaces of circular extremely shallow steps 13 that are lower than the sealing face S, as in Embodiments 1 and 2.

As shown in FIG. 7, when the pumping grooves 14 are provided on the sealing face S facing the low-pressure fluid side of the deep pressure-reduction grooves 15, the high-pressure fluid side of the pumping grooves 14 has no wall to prevent the fluid that tends to leak toward the low-pressure fluid side from being pushed back toward the high-pressure fluid side, even when the pumping grooves 14 are provided on the surfaces of circular extremely shallow steps 13 that are lower than the sealing face S, and consequently sufficient pumping effect can be demonstrated and leakage toward the low-pressure fluid side can be prevented as a result.

The actions/effects of the sliding components pertaining to the embodiments of the present invention are as follows.

With the mechanical seal shown in FIG. 1 having the sliding component pertaining to either Embodiment 1 or 2 of the present invention, the high-pressure sealed fluid enters between the sealing faces S of the stationary ring 3 and rotating ring 6 and acts to widen the gap by means of the dynamic pressure generated in the extremely shallow grooves 10, but because the force that acts to widen the gap is balanced with the fluid pressure that pushes the rotating ring 6 from behind and also the force of the bellows 7, the narrow gap is retained and the sealing faces S remain in a hydrodynamically lubricated state. When this occurs, the present invention where deep fluid-introduction grooves 11 are provided for introducing the high-pressure fluid to the extremely shallow grooves 10 allows the high-pressure fluid to be actively introduced, via the deep fluid-introduction grooves 11, to the upstream side of the extremely shallow grooves 10 in the circumferential direction, and consequently the decompression that would otherwise occur as the fluid flows into the extremely shallow grooves 10 is suppressed and cavitation is prevented as a result. In addition, should any deposit be produced in the extremely shallow grooves 10 or any deposit or other foreign matter enter the grooves, such foreign matter would be discharged from the extremely shallow grooves toward the high-pressure fluid side instead of remaining in the extremely shallow grooves and causing leakage.

Also with the mechanical seal shown in FIG. 1 having the sliding component pertaining to Embodiment 2 of the present invention, the deep pressure-reduction grooves 15 are provided all around in a manner facing the low-pressure fluid side of the extremely shallow grooves 10 and deep fluid-introduction grooves 11 and accordingly the extremely shallow grooves 10 where dynamic pressure generates are separated, by the deep pressure-reduction grooves 15, from the sealing face Son the low-pressure fluid side, and therefore the fluid pressure acting upon the sealing face S on the low-pressure fluid side is reduced to roughly equivalent to the pressure on the high-pressure fluid side and the amount of fluid leaking toward the low-pressure fluid side can be reduced as a result.

Also while the high-pressure fluid (sealed fluid) entering the narrow gap between the sealing faces S tends to leak toward the low-pressure fluid side, with the sliding component pertaining to either Embodiment 1 or 2 of the present invention the fluid that tends to leak toward the low-pressure fluid side is pushed back toward the high-pressure fluid side (sealed fluid side) by the pumping grooves 14 provided in a manner facing the low-pressure fluid side (inner periphery side in FIGS. 2 to 5) of the sealing face S. As a result, the amount of high-pressure fluid (sealed fluid) leaking toward the low-pressure fluid side is reduced considerably.

Furthermore, with the sliding component pertaining to Embodiment 3 of the present invention, the pumping grooves 14 are provided on the sealing face S facing the low-pressure fluid side of the deep pressure-reduction grooves 15, and therefore the high-pressure fluid side of the pumping grooves 14 has no wall to prevent the fluid that tends to leak toward the low-pressure fluid side from being pushed back toward the high-pressure fluid side, even when the pumping grooves 14 are provided on the surfaces of circular extremely shallow steps 13 that are lower than the sealing face S, and consequently sufficient pumping effect can be demonstrated and leakage toward the low-pressure fluid side can be prevented as a result.

Furthermore, with the sliding component pertaining to any one of Embodiments 1 to 3 of the present invention where the pumping grooves 14 are provided on the surfaces of circular extremely shallow steps 13 that are lower than the sealing face S, not like the grooves in Prior Arts 1 and 2 that are directly formed on the sealing face S, the pumping grooves 14 do not directly contact the mating sealing face, even when all fluid on the sealing face S is gone, which prevents the pumping grooves 14 from causing an increase in rotational torque.

The foregoing explained the modes for carrying out the present invention using the drawings, but the specific constitutions are not limited to these modes and changes and additions are also included in the present invention so long as they do not deviate from the key points of the present invention.

In the aforementioned modes, for instance, examples of using the sliding component for either one of a pair of rotating seal ring and fixed seal ring of a mechanical seal device were explained; however, it is possible to use this part as a sliding component of a bearing that slides with a rotational axis while sealing lubricating oil on one side of a cylindrical sealing face in the axial direction.

Additionally in the aforementioned modes, for instance, cases where high-pressure sealed fluid is present on the outer periphery side were explained; however, the present invention can also be applied to cases where high-pressure fluid is present on the inner periphery side, in which event it should be that the extremely shallow grooves 10 and deep fluid-introduction grooves 11 are provided on the inner periphery side of the sealing face and the extremely shallow steps 13 and pumping grooves 14 on the outer periphery side of the sealing face, while the deep pressure-reduction grooves 15 are provided on the outer periphery side of the extremely shallow grooves 10 and deep fluid-introduction grooves 11.

REFERENCE SIGNS LIST

1 Rotational axis
2 Sleeve
3 Rotating ring
4 Housing
5 Seal cover
6 Stationary ring
7 Bellows
10 Extremely shallow grooves
11 Deep fluid-introduction grooves
12 Fine periodic grooves
13 Extremely shallow step
14 Pumping grooves
15 Deep pressure-reduction grooves
S Sealing face
B Radial-direction width of the sealing face (including the extremely shallow step)
b Radial-direction width of the extremely shallow grooves
b' Radial-direction width of the extremely shallow step
h Depth of the extremely shallow grooves from the sealing face
h' Depth of the extremely shallow step from the sealing face

The invention claimed is:

1. A seal comprising a pair of sliding parts that slide against each other on a sealing face thereof,
   wherein the sealing face on one of the sliding parts has:
   extremely shallow grooves each having a Rayleigh step mechanism to generate dynamic pressure as a result of relative motion, being provided in a manner facing a high-pressure fluid side of the sealing face, and being entirely open to the high-pressure fluid side of the sealing face in a radial direction and communicate therewith, and
   deep fluid-introduction grooves for introducing a high-pressure fluid that are provided on an upstream side of the extremely shallow grooves in a manner continuing to the high-pressure fluid side, and are deeper than the extremely shallow grooves, wherein;
   (a) at least one or more extremely shallow grooves and the deep fluid-introduction grooves are provided in an annular pattern, and
   (b) an annular deep pressure-reduction groove is provided in a manner facing a low pressure fluid side of the extremely shallow grooves and deep fluid-introduction grooves, for separating the extremely shallow grooves and deep fluid-introduction grooves from the sealing face on the low-pressure fluid side and thereby reducing a pressure acting upon the sealing face of the low-pressure side.

2. The seal according to claim 1, characterized in that a depth of the extremely shallow grooves from the sealing face is preferably 0.1 to 0.6 µm, and a depth of the deep of the deep fluid-introduction grooves from the sealing face is preferably 10 µm or more.

3. The seal according to claim 1, characterized in that a depth of the deep pressure-reduction groove from the sealing face is preferably 10 µm or more.

4. The seal according to claim 1, further characterized in that pumping grooves provided in a circumferential manner acting to push back toward the high-pressure fluid side a fluid that tends to leak from the high-pressure fluid side toward the low-pressure fluid side are provided on the sealing face facing the low-pressure fluid side.

5. The seal according to claim 1, further characterized in that pumping grooves provided in a circumferential manner acting to push back toward the high-pressure fluid side a fluid that tends to leak from the high-pressure fluid side toward the low-pressure fluid side are provided on the sealing face facing the low-pressure fluid side of the annular deep pressure-reduction groove.

6. The seal according to claim 1, characterized in that a depth of the extremely shallow grooves from the sealing face is preferably 0.1 to 0.6 µm, and a depth of the deep fluid-introduction grooves from the sealing face is preferably 10 µm or more.

7. The seal according to claim 2, characterized in that pumping grooves provided in a circumferential manner acting to push back toward the high-pressure fluid side a fluid that tends to leak from the high-pressure fluid side toward the low-pressure fluid side are provided on the sealing face facing the low-pressure fluid side.

8. The seal according to claim 2, characterized in that pumping grooves provided in a circumferential manner acting to push back toward the high-pressure fluid side a fluid that tends to leak from the high-pressure fluid side toward the low-pressure fluid side are provided on the sealing face facing the low-pressure fluid side of the annular deep pressure-reduction groove.

9. The seal according to claim 3, characterized in that pumping grooves provided in a circumferential manner acting to push back toward the high-pressure fluid side a fluid that tends to leak from the high-pressure fluid side toward the low-pressure fluid side are provided on the sealing face facing the low-pressure fluid side.

10. The seal according to claim 3, characterized in that pumping grooves provided in a circumferential manner acting to push back toward the high-pressure fluid side a fluid that tends to leak from the high-pressure fluid side toward the low-pressure fluid side are provided on the sealing face facing the low-pressure fluid side of the annular deep pressure-reduction groove.

11. The seal according to claim 4, characterized in that the pumping grooves are provided on surfaces of an annular extremely shallow step that is lower than the sealing face.

12. The seal according to claim 5, characterized in that the pumping grooves are provided on surfaces of an annular extremely shallow step that is lower than the sealing face.

\* \* \* \* \*